United States Patent
Wang et al.

(10) Patent No.: US 10,712,877 B2
(45) Date of Patent: Jul. 14, 2020

(54) TOUCH PANEL, METHOD FOR MANUFACTURING THE SAME AND TOUCH DEVICE

(71) Applicant: BOE TECHNOLOGY GROUP CO., LTD., Beijing (CN)

(72) Inventors: Haisheng Wang, Beijing (CN); Xue Dong, Beijing (CN); Jing Lv, Beijing (CN); Xiaochuan Chen, Beijing (CN); Xiaoliang Ding, Beijing (CN); Yingming Liu, Beijing (CN); Rui Xu, Beijing (CN); Shengji Yang, Beijing (CN); Wei Liu, Beijing (CN); Changfeng Li, Beijing (CN); Pengpeng Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/572,373

(22) PCT Filed: May 16, 2017

(86) PCT No.: PCT/CN2017/084518
§ 371 (c)(1),
(2) Date: Nov. 7, 2017

(87) PCT Pub. No.: WO2017/219794
PCT Pub. Date: Dec. 28, 2017

(65) Prior Publication Data
US 2019/0212839 A1   Jul. 11, 2019

(30) Foreign Application Priority Data

Jun. 20, 2016   (CN) .......................... 2016 1 0446587

(51) Int. Cl.
*G06F 3/041* (2006.01)
*G06F 3/044* (2006.01)
*G06F 3/0354* (2013.01)

(52) U.S. Cl.
CPC .......... *G06F 3/044* (2013.01); *G06F 3/03545* (2013.01); *G06F 3/0442* (2019.05);
(Continued)

(58) Field of Classification Search
CPC ..................... G06F 3/044; G06F 3/041; G06F 2203/04106; G06F 2203/04103
See application file for complete search history.

(56) References Cited

U.S. PATENT DOCUMENTS

2011/0316809 A1* 12/2011 Kim ...................... G06F 3/0412
345/174
2014/0347311 A1   11/2014 Joharapurkar et al.
(Continued)

FOREIGN PATENT DOCUMENTS

| CN | 104182105 A | 12/2014 |
|----|-------------|---------|
| CN | 104536629 A | 4/2015  |

(Continued)

OTHER PUBLICATIONS

International Search Report and Written Opinion for Application No. PCT/CN2017/084518, dated Aug. 22, 2017, 9 Pages. x.

*Primary Examiner* — Amit Chatly
(74) *Attorney, Agent, or Firm* — Brooks Kushman P.C.

(57) ABSTRACT

A touch panel, a method for manufacturing the same and a touch device are provided. The touch panel includes a base substrate, and a touch electrode and an active stylus electrode arranged on the base substrate. The active stylus electrode has a size smaller than the touch electrode. The touch electrode is configured to determine a touch position
(Continued)

of a finger, and the active stylus electrode is configured to determine a touch position of an active stylus.

20 Claims, 6 Drawing Sheets

(52) U.S. Cl.
CPC .............. *G06F 2203/04103* (2013.01); *G06F 2203/04106* (2013.01)

(56) References Cited

U.S. PATENT DOCUMENTS

2015/0338937 A1* 11/2015 Shepelev ................ G06F 3/044
345/179
2016/0357337 A1    12/2016 Li et al.

FOREIGN PATENT DOCUMENTS

CN          105094418 A      11/2015
CN          106125975 A      11/2016

* cited by examiner

US 10,712,877 B2

TOUCH PANEL, METHOD FOR MANUFACTURING THE SAME AND TOUCH DEVICE

CROSS-REFERENCE TO RELATED APPLICATIONS

This application is the U.S. national phase of PCT Application No. PCT/CN2017/084518 filed on May 16, 2017, which claims priority to Chinese Patent Application No. 201610446587.8 filed on Jun. 20, 2016, which are incorporated herein by reference in their entireties.

TECHNICAL FIELD

The present disclosure relates to the field of touch display technology, in particular to a touch panel, a method for manufacturing the same and a touch device.

BACKGROUND

A stylus for a touch panel mainly includes a passive stylus and an active stylus. In the case that the active stylus moves close to a conventional touch panel, a touch electrode of the touch panel, as a receiving electrode, may receive a signal from the active stylus, so as to detect a position on the touch panel corresponding to the active stylus. The touch electrode has a very large resistance-capacitance (RC) load, and in the case that the touch electrode of the touch panel is directly used as the receiving electrode for receiving the signal from the active stylus, serious attenuation may occur for the signal after the signal has reached the touch electrode. Hence, detection sensitivity is low and it is very difficult to achieve an effect of the active stylus.

SUMMARY

An object of the present disclosure is to provide a touch panel, a manufacturing method thereof and a touch device, so as to prevent a signal from an active stylus from being attenuated seriously in the case that a touch electrode is used to receive the signal.

In one aspect, the present disclosure provides in some embodiments a touch panel, including a base substrate, and a touch electrode and an active stylus electrode arranged on the base substrate. The active stylus electrode has a size smaller than the touch electrode.

In a possible embodiment of the present disclosure, an orthogonal projection of the active stylus electrode onto the base substrate does not overlap an orthogonal projection of the touch electrode onto the base substrate.

In a possible embodiment of the present disclosure, the touch panel is a mutual-capacitive touch panel, and the touch electrode include a touch sensing electrode and a touch driving electrode.

In a possible embodiment of the present disclosure, the active stylus electrode is created from a layer identical to the touch sensing electrode or the touch driving electrode and made of a same material.

In a possible embodiment of the present disclosure, the touch panel is a self-capacitive touch panel, and the touch electrode is a self-capacitive touch electrode.

In a possible embodiment of the present disclosure, the active stylus electrode is created from a layer identical to the self-capacitive touch electrode and made of a same material.

In a possible embodiment of the present disclosure, the touch panel is an in-cell touch display panel.

In a possible embodiment of the present disclosure, the touch panel further includes a common electrode divided into a plurality of common sub-electrodes, a part of the common sub-electrodes are multiplexed as the active stylus electrodes, and the other part of the common sub-electrodes are multiplexed as the touch electrodes created from a layer identical to the active stylus electrodes and made of a same material.

In a possible embodiment of the present disclosure, the touch electrode created from a layer identical to the active stylus electrode and made of a same material includes at least one hollowed-out region, and the active stylus electrode is located in one hollowed-out region.

In a possible embodiment of the present disclosure, a plurality of active stylus electrodes are located in each hollowed-out portion of the at least one hollowed-out portion.

In a possible embodiment of the present disclosure, a plurality of active stylus electrodes are arranged on the base substrate, and the touch panel further includes a plurality of active stylus electrode lines connected to the active stylus electrodes in a one-to-one correspondence manner.

In a possible embodiment of the present disclosure, the active stylus electrode lines are created from a layer identical to one conductive material layer of the touch panel.

In a possible embodiment of the present disclosure, the conductive material layer is a source-drain metal layer.

In a possible embodiment of the present disclosure, each touch electrode is of a rectangular, diamond or circular shape, or each active stylus electrode is of a rectangular, diamond or circular shape.

In a possible embodiment of the present disclosure, the touch electrodes and the active stylus electrodes are each of a rectangular shape, each touch electrode has a size greater than or equal to 4 mm*4 mm, and each active stylus electrode has a size smaller than or equal to 1 mm*1 mm.

In another aspect, the present disclosure provides in some embodiments a touch device including: the above-mentioned touch panel; an active stylus touch detection module connected to the active stylus electrode and configured to detect a capacitance of the active stylus electrode and determine a touch position of an active stylus in accordance with a capacitance change in the active stylus electrode; and a touch detection module connected to the touch electrode and configured to detect a capacitance of the touch electrode and determine a touch position of a finger in accordance with a capacitance change in the touch electrode.

In yet another aspect, the present disclosure provides in some embodiments a method for manufacturing the above-mentioned touch panel, including steps of: providing a base substrate; and forming a touch electrode and an active stylus electrode on the base substrate, the active stylus electrode having a size smaller than the touch electrode, the touch electrode being configured to determine a touch position of a finger, and the active stylus electrode being configured to determine a touch position of an active stylus.

In a possible embodiment of the present disclosure, an orthogonal projection of the active stylus electrode onto the base substrate does not overlap an orthogonal projection of the touch electrode onto the base substrate.

In a possible embodiment of the present disclosure, a plurality of touch electrodes and a plurality of active stylus electrodes are formed on the base substrate.

In a possible embodiment of the present disclosure, the touch panel is a mutual-capacitive touch panel and includes a plurality of touch electrodes and a plurality of active stylus electrodes, the plurality of touch electrodes comprise a plurality of touch sensing electrodes and a plurality of touch driving electrodes, and the step of forming the plurality of touch electrodes and the plurality of active stylus electrodes on the base substrate comprises forming one layer of the touch sensing electrodes or the touch driving electrodes together with the active stylus electrodes through a single patterning process.

In a possible embodiment of the present disclosure, the touch panel is a self-capacitive touch panel, the touch electrode is a self-capacitive touch electrode, and the step of forming the plurality of touch electrodes and the plurality of active stylus electrodes on the base substrate includes forming the active stylus electrodes and the self-capacitive touch electrodes through a single patterning process.

In a possible embodiment of the present disclosure, the manufacturing method further includes forming a plurality of active stylus electrode lines connected to the active stylus electrodes in a one-to-one correspondence manner.

In a possible embodiment of the present disclosure, each active stylus electrode line and one conductive material layer of the touch panel are formed through a single patterning process.

According to the embodiments of the present disclosure, the separately-arranged active stylus electrode, rather than the touch electrode, serves as a receiving electrode for receiving a signal from the active stylus. The active stylus electrode has a size smaller than the touch electrode, so it has a very small RC load as compared with the touch electrode. As a result, it is able to prevent the signal from the active stylus from being attenuated seriously, thereby to enable a touch operation made by the active stylus to be more sensitive and improve a touch effect.

Figure 1:
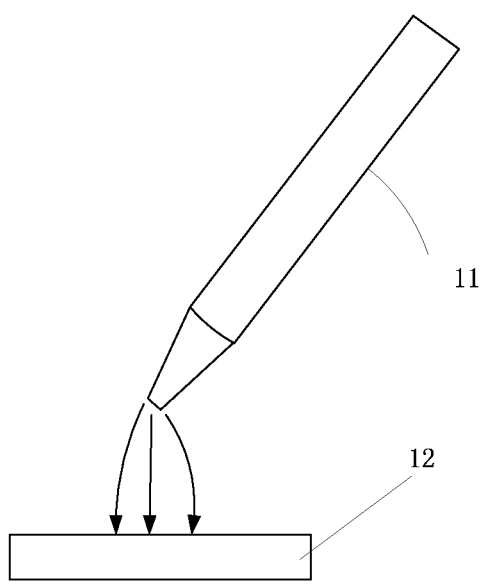
FIG. 1 is a schematic view showing a working principle of an active stylus.

REFERENCE SIGN LIST 11 active stylus
12 touch electrode
20A array substrate
20B color filter substrate
20C liquid crystal layer
20D first polarizer
20E second polarizer
21 base substrate
221 touch sensing electrode
222 touch driving electrode
23 active stylus electrode
24 active stylus electrode line
25 self-capacitive touch electrode
26 touch electrode line
27 source-drain metal layer
61 finger

DETAILED DESCRIPTION

Referring to FIG. 1 which is a schematic view showing a working principle of an active stylus, the active stylus 11 is provided with a corresponding signal generator configured to generate a signal, e.g., a pulse signal having a specific frequency. This signal generator serves as a transmitting electrode (TX) of the active stylus 11. A receiving electrode (RX) on a touch panel receives the signal from the active stylus 11. In the case that a distance between the active stylus 11 and the touch panel changes, the signal received by the receiving electrode (RX) may change too. The active stylus 11 may further be configured to provide more functions. For example, it may be used to achieve a dragging stroke in the case of Chinese brush writing, or it may be used to detect a pressure applied by a hand onto the active stylus.

In the related art, in the case that the active stylus 11 moves close to the touch panel, a touch electrode 12 of the touch panel, as the receiving electrode (RX), may receive the signal from the active stylus 11, so as to detect a position on the touch panel corresponding to the active stylus 11. The touch electrode has a very large RC load, and in the case that the touch electrode of the touch panel is directly used as the receiving electrode for receiving the signal from the active stylus, serious attenuation may occur for the signal after the signal has reached the touch electrode. Hence, detection sensitivity is low and it is very difficult to achieve an effect of the active stylus.

In order to solve the above-mentioned drawback, the present disclosure provides in some embodiments a touch panel, which includes a base substrate, and touch electrodes and active stylus electrodes arranged on the base substrate. Each active stylus electrode has a size smaller than each touch electrode. The touch electrode is configured to determine a touch position of a finger, and the active stylus electrode is configured to determine a touch position of an active stylus. In actual use, a plurality of touch electrodes and a plurality of active stylus electrodes are arranged on the base substrate. The active stylus electrodes may have a same size or different sizes. It should be appreciated that, the number of the active stylus electrodes on the base substrate will not be particularly defined herein.

According to the touch panel in the embodiments of the present disclosure, the separately-arranged active stylus electrode, rather than the touch electrode, serves as a receiving electrode for receiving a signal from the active stylus. The active stylus electrode has a size smaller than the touch electrode, so it has a very small RC load as compared with the touch electrode. As a result, it is able to prevent a signal from the active stylus from being attenuated seriously, thereby to enable a touch operation made by the active stylus to be more sensitive and improve a touch effect.

If the touch panel is an in-cell touch panel and the touch electrode of the in-cell touch panel serves as the receiving electrode for receiving the signal from the active stylus, the in-cell touch electrode is arranged close to a display-related electrode (e.g., a pixel electrode, a gate electrode or a source electrode) on a display panel, so the RC load of the in-cell touch electrode is very large. After the signal from the active stylus reaches the in-cell touch electrode, very serious attenuation may occur for the signal, and it is very difficult to achieve an effect of the active stylus. However, in the embodiments of the present disclosure, the active stylus electrode is arranged separately, and it may be less affected by the display-related electrode (e.g., the pixel electrode, the gate electrode or the source electrode) on the touch panel as compared with the touch electrode having a relatively large size, i.e., the RC load of the active stylus electrode is very small. As a result, it is able to prevent the signal from the active stylus from being attenuated seriously, thereby to enable the touch operation made by the active stylus to be more sensitive and improve the touch effect.

In a possible embodiment of the present disclosure, the touch panel further includes a plurality of active stylus electrode lines connected to the active stylus electrodes in a one-to-one correspondence manner.

In a possible embodiment of the present disclosure, an orthogonal projection of the active stylus electrode onto the base substrate does not overlap an orthogonal projection of the touch electrode onto the base substrate, so as to prevent a signal shielding between the active stylus electrode and the touch electrode.

In a possible embodiment of the present disclosure, the touch panel is a mutual-capacitive touch panel, and the touch electrode includes a touch sensing electrode and a touch driving electrode. Further, the active stylus electrode is created from a layer identical to the touch sensing electrode or the touch driving electrode, and made of the same material with the touch sensing electrode or the touch driving electrode, so as to reduce the number of masking processes while reducing a thickness of the touch panel, thereby to reduce the manufacture cost.

In another possible embodiment of the present disclosure, the touch panel is a self-capacitive touch panel, and the touch electrode is a self-capacitive touch electrode. Further, the active stylus electrode is created from a layer identical to the self-capacitive touch electrode and made of the same material with the self-capacitive touch electrode.

The touch panel may be a touch display panel, e.g., an in-cell or add-on touch display panel.

The present disclosure will be described hereinafter in conjunction with the drawings and embodiments. The following embodiments are for illustrative purposes only, but shall not be used to limit the scope of the present disclosure.

Figure 2:
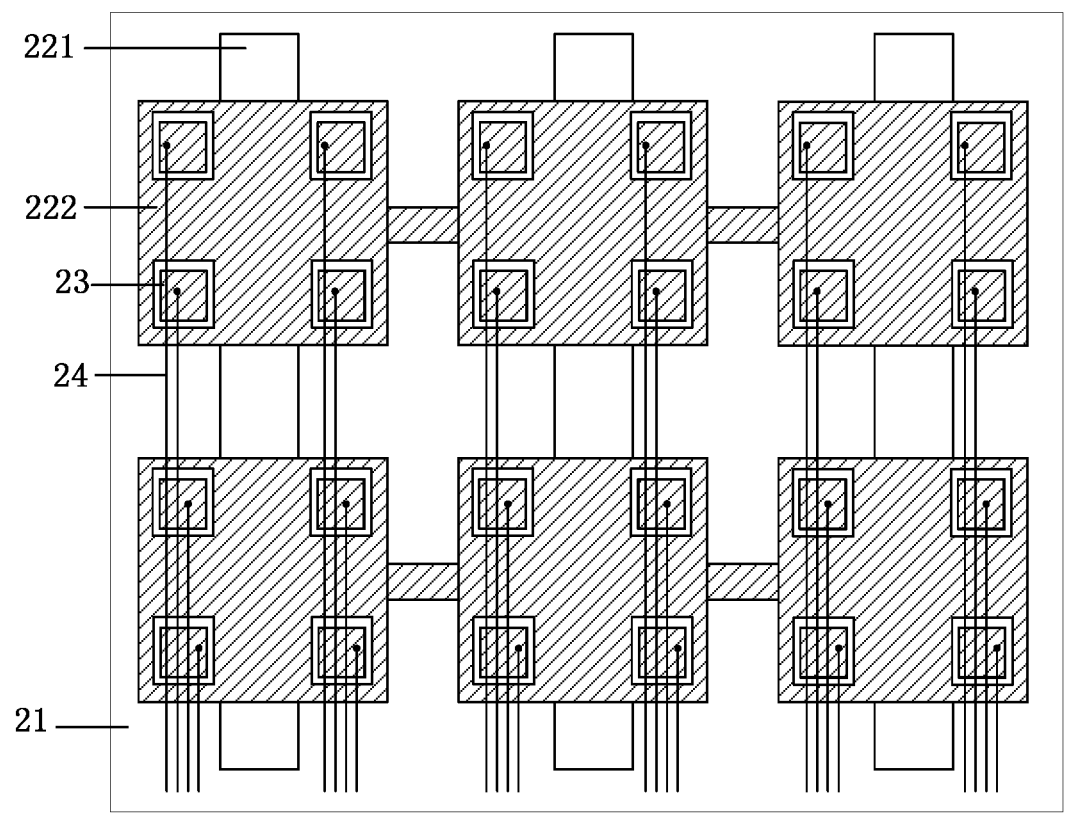
FIG. 2 is a schematic view showing a touch panel according to at least one embodiment of the present disclosure.

Referring to FIG. 2, the touch panel is a mutual-capacitive touch panel, and includes a base substrate 21, and a plurality of touch electrodes, a plurality of active stylus electrodes 23 and a plurality of active stylus electrode lines 21 arranged on the base substrate 21. The touch electrodes include touch sensing electrodes 221 and touch driving electrodes 222. Each active stylus electrode 23 corresponds one active stylus electrode line 24.

Each active stylus electrode 23 has a size smaller than that of the touch sensing electrode 221 or the touch driving electrode 222. An orthogonal projection of each active stylus electrode 23 onto the base substrate 21 does not overlap both an orthogonal projection of the touch sensing electrode 221 and the touch driving electrode 222 onto the base substrate 21.

In a possible embodiment of the present disclosure, each touch driving electrode 222 is a block-like electrode, and the plurality of touch driving electrodes 222 in an identical row are connected to each other. Each touch sensing electrode 221 is a strip-like electrode. Of course, in some other embodiments of the present disclosure, each touch sensing electrode 221 may also be a block-like electrode. The block-like electrode is of a rectangular shape, and in some other embodiments of the present disclosure, it may also be of a diamond or circular shape. In a possible embodiment of the present disclosure, the touch electrodes and the active stylus electrodes are each of a rectangular shape, each touch electrode has a size greater than or equal to 4 mm*4 mm, and each active stylus electrode has a size smaller than or equal to 1 mm*1 mm. It should be appreciated that, the sizes of the touch driving electrodes and the active stylus electrodes will not be particularly defined herein, as long as the size of the active stylus electrode is smaller than the size of the touch driving electrode.

In a possible embodiment of the present disclosure, each touch driving electrode 222 has a size of 4 mm*4 mm, and each active stylus electrode 23 has a size smaller than 1 mm*1 mm, i.e., far smaller than the size of the touch driving electrode 222. Further, the active stylus electrodes 23 are created from a layer identical to the touch driving electrodes 222, and they may be formed through a single patterning process and made of the same material, so as to reduce the number of masking processes while reducing a thickness of the touch panel, thereby to reduce the manufacture cost.

In some other embodiments of the present disclosure, the active stylus electrodes may also be created from a layer identical to the touch sensing electrodes and made of the same material with the touch sensing electrodes.

Of course, in some other embodiments of the present disclosure, the active stylus electrodes may also be arranged at a separate layer.

In a possible embodiment of the present disclosure, each touch driving electrode 222 is provided with four hollowed-out regions, and one active stylus electrode 23 is arranged at each hollowed-out region, i.e., the active stylus electrode 23 is arranged within the corresponding touch driving electrode 222.

Figure 3:
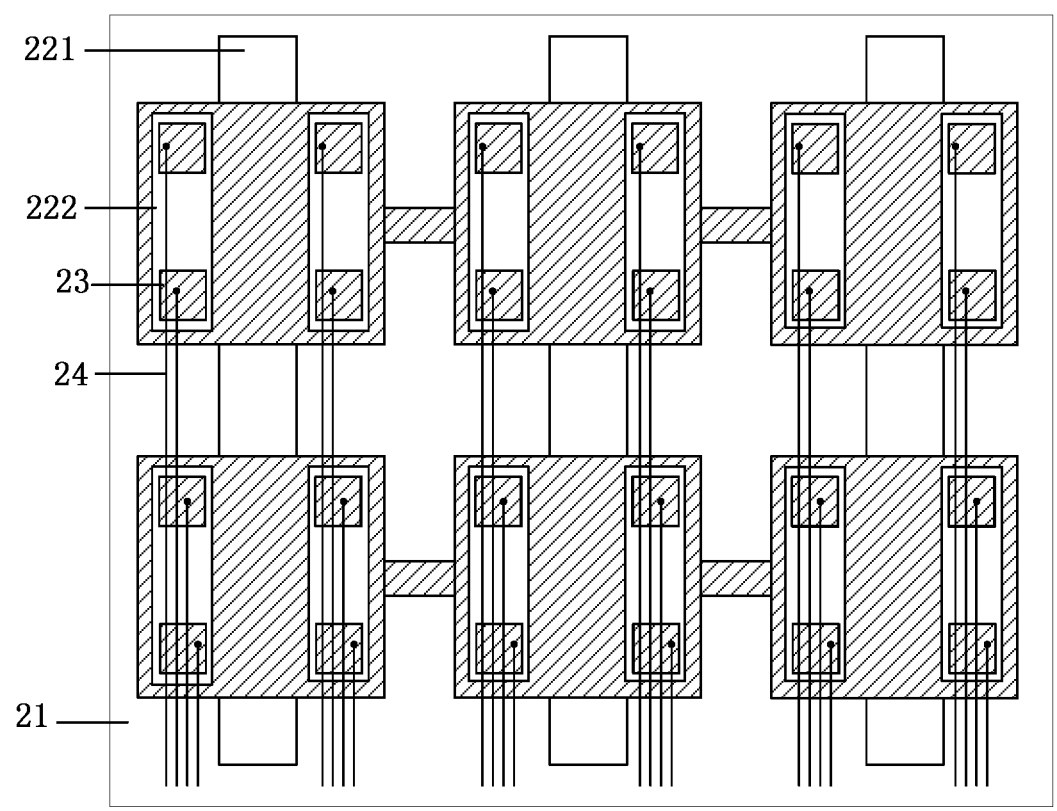
FIG. 3 is another schematic view showing the touch panel according to at least one embodiment of the present disclosure.

Referring to FIG. 3, in some other embodiments of the present disclosure, the number of the hollowed-out regions of the touch driving electrode 222 will not be particularly defined. In addition, at each hollowed-out region, one or more active stylus electrodes 23 may be arranged.

Figure 4:
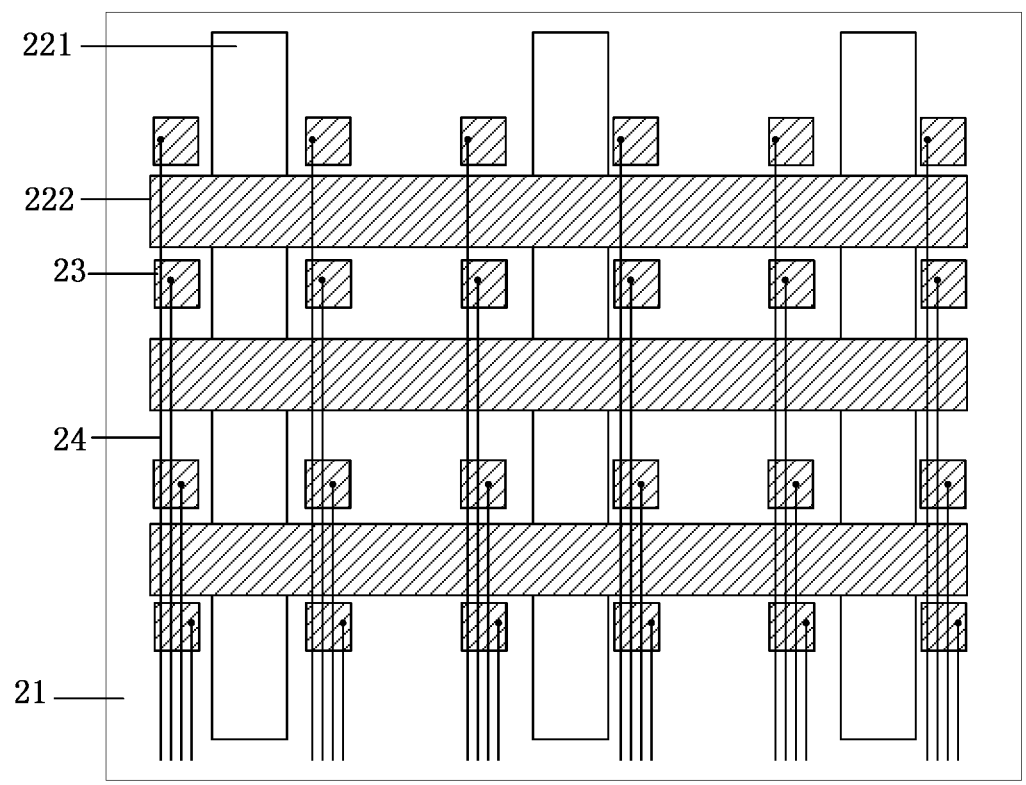
FIG. 4 is yet another schematic view showing the touch panel according to at least one embodiment of the present disclosure.

Of course, in some other embodiments, each active stylus electrode may also be arranged outside the corresponding touch electrode created from a layer identical to the active stylus electrode. Referring to FIG. 4, the active stylus electrode 23 is arranged outside the corresponding touch driving electrode 222. The touch driving electrodes 222 and the touch sensing electrodes 221 are each a strip-like electrode.

Figure 5:
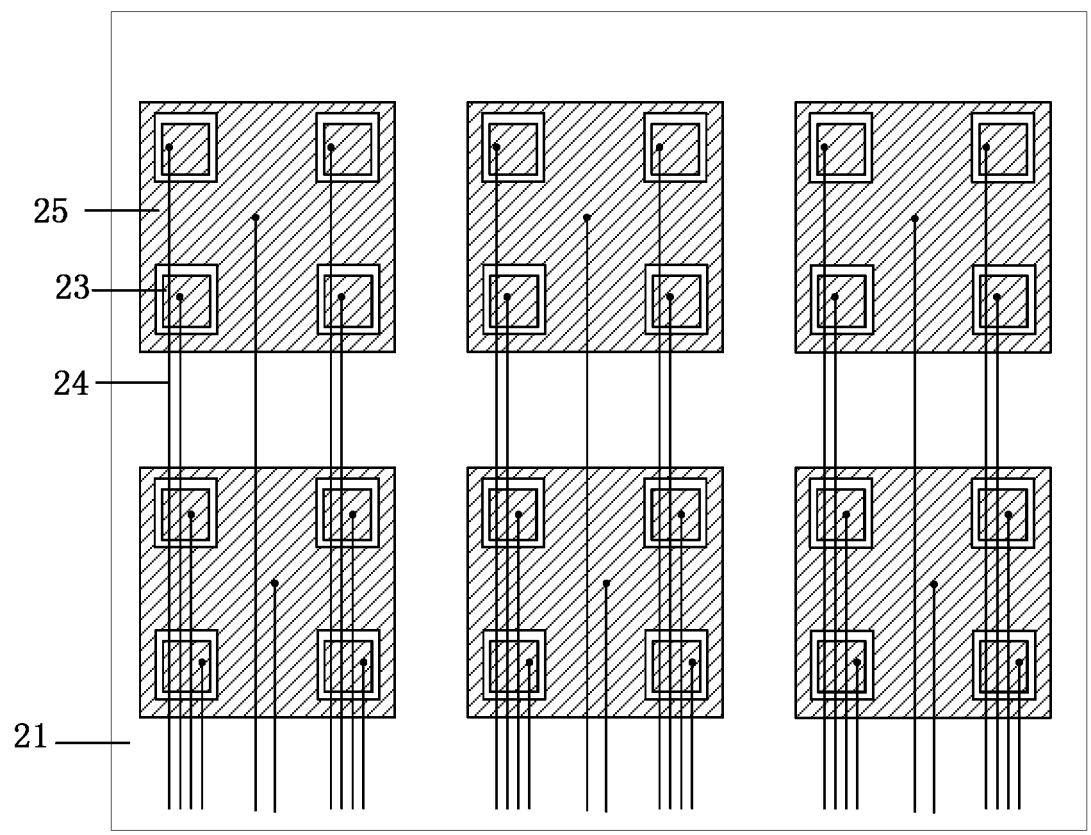
FIG. 5 is still yet another schematic view showing the touch panel according to at least one embodiment of the present disclosure.

Referring to FIG. 5, the touch panel is a self-capacitive touch panel, and includes a base substrate 21, and a plurality of self-capacitive touch electrodes 25, a plurality of active stylus electrodes 23 and a plurality of active stylus electrode lines 24 arranged on the base substrate 21. Each active stylus electrode 23 corresponds to one active stylus electrode line 24.

Each active stylus electrode 23 has a size smaller than that of the self-capacitive touch electrode 25, and an orthogonal projection of each active stylus electrode 23 onto the base substrate 21 does not overlap an orthogonal projection of the self-capacitive touch electrode 25 onto the base substrate 21.

In a possible embodiment of the present disclosure, each self-capacitive touch electrode 25 is a block-like electrode, and corresponds to one touch electrode line. In a possible embodiment of the present disclosure, the block-like electrode is of a rectangular shape, and in some other embodiments of the present disclosure, the block-like electrode may also be of a diamond or circular shape.

In a possible embodiment of the present disclosure, each self-capacitive touch electrode 25 has a size of 4 mm*4 mm, and each active stylus electrode 23 has a size smaller than 1 mm*1 mm, i.e., far smaller than the size of the self-capacitive touch electrode 25.

In a possible embodiment of the present disclosure, the active stylus electrodes 23 are created from a layer identical to the self-capacitive touch electrodes 25 and made of the same material with the self-capacitive touch electrodes, and they may be formed through a single patterning process, so as to reduce the number of masking processes while reducing a thickness of the touch panel, thereby to reduce the manufacture cost.

Of course, in some other embodiments of the present disclosure, the active stylus electrodes may also be arranged at one separate layer.

In a possible embodiment of the present disclosure, each self-capacitive touch electrode 25 is provided with four hollowed-out regions, and one active stylus electrode 23 is arranged at each hollowed-out region, i.e., the active stylus electrode 23 is arranged within the corresponding self-capacitive touch electrode 25.

In some other embodiments of the present disclosure, the number of the hollowed-out regions of each self-capacitive touch electrode 25 will not be particularly defined. Further, at each hollowed-out region, more than one active stylus electrodes 23 may be arranged.

Of course, in some other embodiments of the present disclosure, each active stylus electrode may also be arranged outside the corresponding self-capacitive touch electrode.

In a possible embodiment of the present disclosure, the touch panel may be an in-cell touch display panel and further include a common electrode which is divided into a plurality of common sub-electrodes. A part of the common sub-electrodes are multiplexed as the active stylus electrodes, and the other part of the common sub-electrodes are multiplexed as the touch electrodes created from a layer identical to the active stylus electrodes and made of the same material with the active stylus electrodes. In the case that the common electrode is multiplexed as the active stylus electrodes and the touch electrodes, it is able to reduce the number of masking processes, thereby to reduce the manufacture cost.

For example, in the case that the touch panel is a mutual-capacitive touch panel, the common sub-electrodes may be multiplexed as the active stylus electrodes and the touch driving electrodes, i.e., the active stylus electrodes may be created from a layer identical to the common electrode and made of the same material through a signal patterning process, so as to reduce the number of masking process while reducing a thickness of the touch panel, thereby to reduce the manufacture cost.

In the case that the touch panel is a self-capacitive touch panel, the common sub-electrodes may be multiplexed as the active stylus electrodes and the self-capacitive touch electrodes, i.e., the active stylus electrodes may be created from a layer identical to the common electrode and made of the same material with the common electrode.

It should be appreciated that, in the case that the common electrode is multiplexed as the active stylus electrodes and the touch electrodes created from a layer identical to the active stylus electrodes and made of the same material, each active stylus electrode cannot be arranged within by the corresponding touch electrode. In other words, the common electrode is not provided with any hollowed-out region, so as to prevent a display effect from being adversely affected.

In some other embodiments of the present disclosure, the active stylus electrode lines may be created from a layer identical to one conductive material layer of the touch panel and made of the same material with the conductive material layer. The conductive material layer may be a source-drain metal layer, a gate metal layer or a pixel electrode layer. Of course, the active stylus electrode lines may also be arranged at one separate layer.

In the embodiments of the present disclosure, the number of the active stylus electrodes will not be particularly defined. Of course, the more the active stylus electrodes are, the higher the detection accuracy is.

The present disclosure further provides in some embodiments a touch device including: the above-mentioned touch panel; an active stylus touch detection module connected to the active stylus electrode and configured to detect a capacitance of the active stylus electrode and determine a touch position of an active stylus in accordance with a capacitance change in the active stylus electrode; and a touch detection module connected to the touch electrode and configured to detect a capacitance of the touch electrode and determine a touch position of a finger in accordance with a capacitance change in the touch electrode.

In a possible embodiment of the present disclosure, the active stylus touch detection module is connected to the active stylus electrodes via active stylus electrode lines, and each active stylus electrode correspond to one active stylus electrode line. The active stylus touch detection module and the touch detection module may be integrated into one chip.

Figure 6:
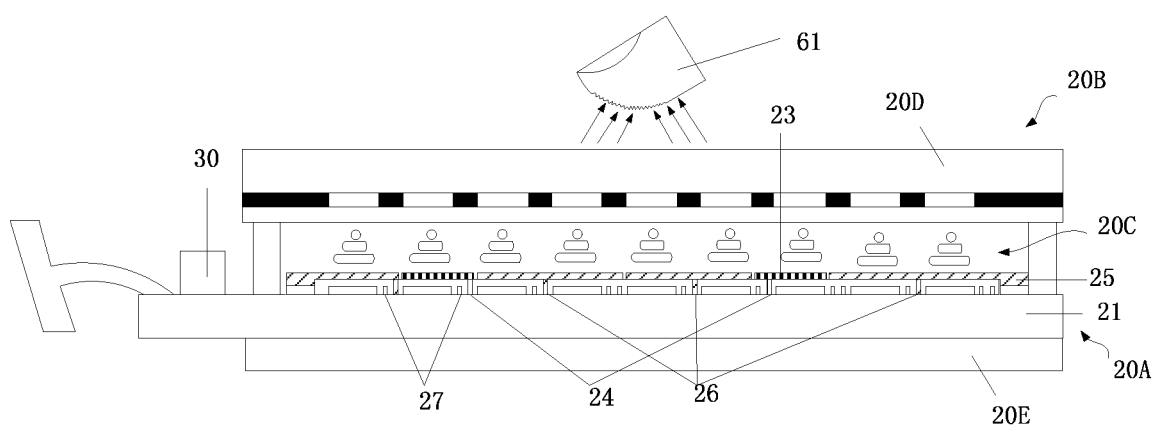
FIGS. 6 and 7 are schematic views showing a touch device according to at least one embodiment of the present disclosure.
Figure 7:
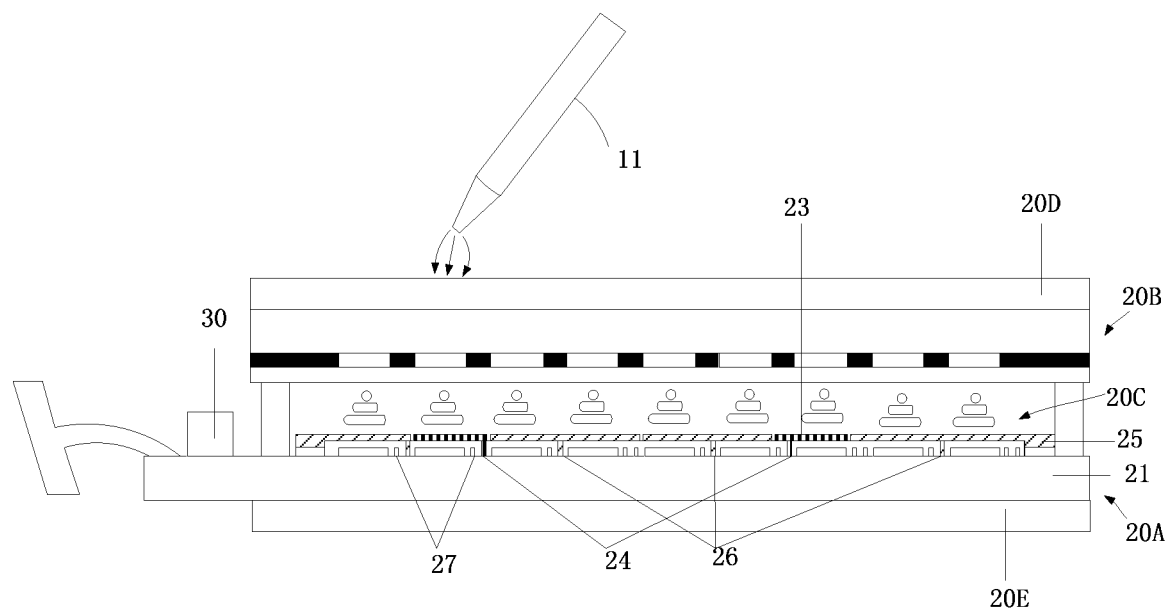

Referring to FIGS. 6 and 7, the touch device includes a touch panel and a touch detection chip 30. The touch panel is a self-capacitive touch display panel and includes an array substrate 20A, a color filter substrate 20B and a liquid crystal layer 20C arranged therebetween. The array substrate 20A includes a base substrate 21, and a plurality of self-capacitive touch electrodes 25, a plurality of active stylus electrodes 23 and a plurality of active stylus electrode lines 24 arranged on the base substrate 21. Each active stylus electrode 23 corresponds to one active stylus electrode line 24, and each self-capacitive touch electrode 25 corresponds to one touch electrode line 26. Each active stylus electrode 23 has a size smaller than the corresponding self-capacitive touch electrode 25, and an orthogonal projection of each active stylus electrode 23 onto the base substrate 21 does not overlap an orthogonal projection of each self-capacitive touch electrode 25 onto the base substrate 21. The touch electrode lines 26 and the active stylus electrode lines 24 are created from a layer identical to a source-drain metal layer 27 and made of a same material.

The touch detection chip 30 is configured to achieve functions of the active stylus touch detection module and the touch detection module, i.e., to detect a capacitance of each active stylus electrode 23 and determine a touch position of the active stylus in accordance with a capacitance change in the active stylus electrode 23, and detect a capacitance of each self-capacitive touch electrode 25 and determine a touch position of a finger in accordance with a capacitance change in the self-capacitive touch electrode 25.

In addition, the touch device further includes a first polarizer 20D arranged at one side of the color filter substrate 20B and a second polarizer 20E arranged at one side of the array substrate 20A.

Referring to FIG. 6, in the case that the touch panel is normally touched by the finger 61, an electric field signal generated by the self-capacitive touch electrode 25 may be absorbed by the finger 61 and thus a capacitance of the self-capacitive touch electrode 25 may change. At this time, the touch performance will not be adversely affected by the self-capacitive touch electrode 25.

Referring to FIG. 7, in the case that the touch panel is touched by the active stylus 11, the signal from the active stylus 11 is detected by the self-capacitive touch electrode 25 having a small size, so no serious attenuation may occur for the signal from the active stylus 11. In addition, the active stylus electrode 23 is arranged separate from the self-capacitive touch electrode 25, so it is able to perform the touch operations by the active stylus and the finger at the same time, and meanwhile detect the touch operations separately.

The present disclosure further provides in some embodiments a method for manufacturing the above-mentioned touch panel, which includes: Step S101 of providing a base substrate; and Step S102 of forming a touch electrode and an active stylus electrodes on the base substrate, the active stylus electrode having a size smaller than that of the touch electrode.

In actual use, in Step 102, a plurality of touch electrodes and a plurality of active stylus electrodes are formed on the base substrate.

In a possible embodiment of the present disclosure, the touch panel is a mutual-capacitive touch panel, the touch electrodes include touch sensing electrodes and touch driving electrodes, and the step of forming the plurality of touch electrodes and the plurality of active stylus electrodes on the base substrate includes forming one layer of the touch sensing electrodes or the touch driving electrodes together with the active stylus electrodes through a single patterning process.

In a possible embodiment of the present disclosure, the touch panel is a self-capacitive touch panel, each touch electrode is a self-capacitive touch electrode, and the step of forming the plurality of touch electrodes and the plurality of active stylus electrodes on the base substrate includes forming the active stylus electrodes and the self-capacitive touch electrodes through a single patterning process.

In a possible embodiment of the present disclosure, the manufacturing method further includes forming a plurality of active stylus electrode lines connected to the active stylus electrodes in a one-to-one correspondence manner.

In a possible embodiment of the present disclosure, each active stylus electrode line and one conductive material layer of the touch panel are formed through a single patterning process.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A touch panel, comprising a base substrate, and a touch electrode and an active stylus electrode arranged on the base substrate, wherein the active stylus electrode has a size smaller than that of the touch electrode, a touch position of a finger is only determined by the touch electrode, and a touch position of an active stylus is only determined by the active stylus electrode,
wherein the touch electrode comprises a touch sensing electrode and a touch driving electrode,
the touch sensing electrode and the touch driving electrode cross to each other and are arranged at different layers,
each of the touch sensing electrode and the touch driving electrode is a strip-like electrode,
each active stylus electrode is arranged outside the corresponding touch electrode created from a layer identical to the active stylus electrode.

2. The touch panel according to claim 1, wherein the touch panel is a mutual-capacitive touch panel, and the touch electrode comprise a touch sensing electrode and a touch driving electrode.

3. The touch panel according to claim 2, wherein the active stylus electrode is created from a layer identical to the touch sensing electrode or the touch driving electrode and made of a same material with the touch sensing electrode or the touch driving electrode.

4. The touch panel according to claim 1, wherein the touch panel is a self-capacitive touch panel, and the touch electrode is a self-capacitive touch electrode.

5. The touch panel according to claim 4, wherein the active stylus electrode is created from a layer identical to the self-capacitive touch electrode and made of a same material with the self-capacitive touch electrode.

6. The touch panel according to claim 3, wherein the touch panel is an in-cell touch display panel.

7. The touch panel according to claim 6, further comprising a common electrode, wherein the common electrode is divided into a plurality of common sub-electrodes, a part of the plurality of common sub-electrodes are multiplexed as the active stylus electrode, and the other part of the plurality of common sub-electrodes are multiplexed as the touch electrode created from a layer identical to the active stylus electrode and made of a same material.

8. The touch panel according to claim 3, wherein the touch electrode created from a layer identical to the active stylus electrode and made of a same material comprises at least one hollowed-out region, and the active stylus electrode is located in the at least one hollowed-out region.

9. The touch panel according to claim 8, wherein a plurality of active stylus electrodes are located in each hollowed-out portion of the at least one hollowed-out portion.

10. The touch panel according to claim 1, wherein a plurality of active stylus electrodes are arranged on the base substrate, and the touch panel further comprises a plurality of active stylus electrode lines connected to the plurality of active stylus electrodes in a one-to-one correspondence manner.

11. The touch panel according to claim 10, wherein the plurality of active stylus electrode lines are created from a layer identical to one conductive material layer of the touch panel and made of a same material with the conductive material layer.

12. The touch panel according to claim 11, wherein the conductive material layer is a source-drain metal layer.

13. The touch panel according to claim 1, wherein an orthogonal projection of the active stylus electrode onto the base substrate does not overlap an orthogonal projection of the touch electrode onto the base substrate.

14. The touch panel according to claim 1, wherein the touch electrode is of a rectangular, diamond or circular shape, or the active stylus electrode is of a rectangular, diamond or circular shape.

15. The touch panel according to claim 14, wherein the touch electrode and the active stylus electrode are both a rectangular shape, the touch electrode has a size greater than or equal to 4 mm*4 mm, and the active stylus electrode has a size smaller than or equal to 1 mm*1 mm.

16. A touch device, comprising:
a touch panel comprising a base substrate, and a touch electrode and an active stylus electrode arranged on the base substrate, the active stylus electrode having a size smaller than the touch electrode;

an active stylus touch detection module connected to the active stylus electrode and configured to detect a capacitance of the active stylus electrode and only determine a touch position of an active stylus in accordance with a capacitance change in the active stylus electrode; and a touch detection module connected to the touch electrode and configured to detect a capacitance of the touch electrode and only determine a touch position of a finger in accordance with a capacitance change in the touch electrode, wherein the touch electrode comprises a touch sensing electrode and a touch driving electrode, the touch sensing electrode and the touch driving electrode cross to each other and are arranged at different layers, each of the touch sensing electrode and the touch driving electrode is a strip-like electrode, each active stylus electrode is arranged outside the corresponding touch electrode created from a layer identical to the active stylus electrode.

17. The touch device according to claim 16, wherein the active stylus touch detection module is connected to the active stylus electrode via an active stylus electrode line, a plurality of active stylus electrode lines are connected to a plurality of active stylus electrodes in a one-to-one correspondence manner.

18. A method for manufacturing a touch panel, comprising steps of:

providing a base substrate; and forming a touch electrode and an active stylus electrode on the base substrate, the active stylus electrode having a size smaller than the touch electrode, the touch electrode being configured to only determine a touch position of a finger, and the active stylus electrode being configured to only determine a touch position of an active stylus, wherein the touch electrode comprises a touch sensing electrode and a touch driving electrode, the touch sensing electrode and the touch driving electrode cross to each other and are arranged at different layers, each of the touch sensing electrode and the touch driving electrode is a strip-like electrode, each active stylus electrode is arranged outside the corresponding touch electrode created from a layer identical to the active stylus electrode.

19. The method according to claim 18, wherein the touch panel is a mutual-capacitive touch panel and includes a plurality of touch electrodes and a plurality of active stylus electrodes, the plurality of touch electrodes comprise a plurality of touch sensing electrodes and a plurality of touch driving electrodes, and the step of forming the plurality of touch electrodes and the plurality of active stylus electrodes on the base substrate comprises forming one layer of the touch sensing electrodes or the touch driving electrodes together with the active stylus electrodes through a single patterning process.

20. The method according to claim 18, wherein the touch panel is a self-capacitive touch panel and includes a plurality of touch electrodes and a plurality of active stylus electrodes, the plurality of touch electrodes are a plurality of self-capacitive touch electrodes, and the step of forming the plurality of touch electrodes and the plurality of active stylus electrodes on the base substrate comprises forming the plurality of active stylus electrodes and the plurality of self-capacitive touch electrodes through a single patterning process.

* * * * *